United States Patent [19]

Takasaki et al.

[11] Patent Number: 5,088,031
[45] Date of Patent: Feb. 11, 1992

[54] VIRTUAL MACHINE FILE CONTROL SYSTEM WHICH TRANSLATES BLOCK NUMBERS INTO VIRTUAL ADDRESSES THEN INTO REAL ADDRESSES FOR ACCESSING MAIN STORAGE

[75] Inventors: Shigeo Takasaki; Masaichiro Yoshioka, both of Sagamihara; Takashige Kubo, Hachioji; Yoshio Ukai; Yasuo Kubo, both of Yokohama; Jinichi Imura, Yokosuka; Nobutaka Hagiwara, Fujisawa, all of Japan

[73] Assignee: Hitachi, Ltd., Tokyo, Japan

[21] Appl. No.: 827,607

[22] Filed: Feb. 10, 1986

[30] Foreign Application Priority Data

Feb. 20, 1985 [JP] Japan .................. 60-30365

[51] Int. Cl.⁵ .................................. G06F 12/10
[52] U.S. Cl. .................... 395/400; 364/280; 364/256.3; 364/254.3; 364/256.5; 364/DIG. 1
[58] Field of Search ... 364/200 MS File, 900 MS File

[56] References Cited

U.S. PATENT DOCUMENTS

| | | | |
|---|---|---|---|
| 3,854,126 | 12/1974 | Gray | 364/200 |
| 3,964,028 | 6/1976 | Belady | 364/200 |
| 4,037,215 | 7/1977 | Birney | 364/200 |
| 4,130,870 | 12/1978 | Schneider | 364/200 |
| 4,145,738 | 3/1979 | Inoue | 364/200 |
| 4,253,145 | 2/1981 | Goldberg | 364/200 |
| 4,385,352 | 5/1983 | Bienvenu | 364/200 |
| 4,395,757 | 7/1983 | Bienvenu | 364/200 |
| 4,400,769 | 8/1983 | Kaneda et al. | 364/200 |
| 4,456,954 | 6/1984 | Bullions | 364/200 |
| 4,459,661 | 7/1984 | Kaneda et al. | 364/200 |
| 4,467,421 | 8/1984 | White | 364/200 |
| 4,494,189 | 1/1985 | Bean | 364/200 |
| 4,495,575 | 1/1985 | Eguchi | 364/200 |
| 4,638,426 | 1/1987 | Chang | 364/200 |
| 4,660,144 | 4/1987 | Walsh | 364/200 |
| 4,733,350 | 3/1988 | Tone | 364/200 |
| 4,742,450 | 5/1988 | Duvall | 364/200 |
| 4,757,447 | 7/1988 | Woffinden | 364/200 |
| 4,758,951 | 7/1988 | Sznyter, III | 364/200 |
| 4,774,659 | 9/1988 | Smith | 364/200 |
| 4,779,188 | 10/1988 | Gum | 364/200 |
| 4,787,031 | 11/1988 | Karger | 364/200 |
| 4,819,154 | 4/1989 | Stiffler | 371/12 |
| 4,885,681 | 12/1989 | Umeno | 364/200 |
| 4,985,828 | 1/1991 | Shimizu | 364/200 |

*Primary Examiner*—Thomas C. Lee
*Assistant Examiner*—Eric Coleman
*Attorney, Agent, or Firm*—Antonelli, Terry, Stout & Kraus

[57] ABSTRACT

A file control system for virtual machines capable of executing simultaneously a plurality of operating systems in a single computer system under control of a virtual machine monitor for controlling the operating systems, wherein interface means for file input/output operation are provided between the virtual machine monitor and the operating systems for allowing the virtual machine monitor to manage a plurality of files owned by the virtual machines.

2 Claims, 13 Drawing Sheets

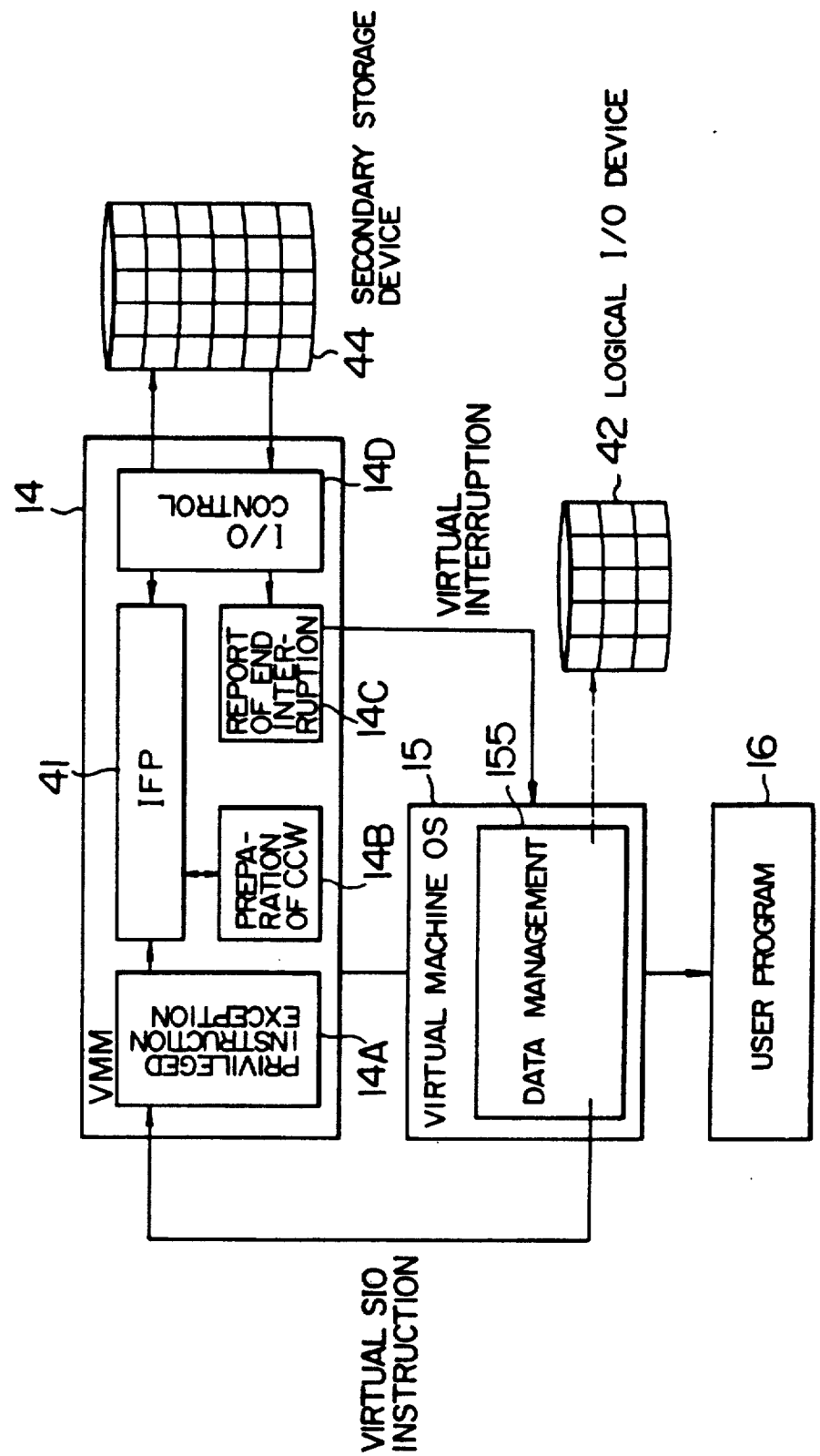
F I G. 12

| BYTE | BIT | MEANING |
|---|---|---|
| 0 | 0 | CONTRADICTION TO COMMAND |
| | 1~7 | UNUSED |
| 1 | 0 | FILE I/O ERROR |
| | 1~6 | UNUSED |
| | 7 | CONTRADICTION TO FILE NAME |

VIRTUAL MACHINE FILE CONTROL SYSTEM WHICH TRANSLATES BLOCK NUMBERS INTO VIRTUAL ADDRESSES THEN INTO REAL ADDRESSES FOR ACCESSING MAIN STORAGE

BACKGROUND OF THE INVENTION

The present invention relates to a file control system for a virtual machine system in which a dedicated memory space is provided between an operating system of a virtual machine and a control means, such as virtual machine monitor for controlling the virtual machine, for inputting of files used for the operating system, the memory space being managed by a specialized communication means or by the virtual machine monitor, so that the management of the files possessed by the operating system can be performed on the side of the virtual machine monitor and the inputting/outputting of the files can be facilitated.

In a virtual machine system, a plurality of logical machines (referred to as a virtual machine) are created within a single system, each of the virtual machines permitting the conventional operating systems (hereinafter referred to as OS in abbreviation) to operate without modification. To realize such a virtual machine, a virtual machine monitor (hereinafter abbreviated to VMM) for controlling the virtual machine is imparted with capabilities for virtualize hardware resources such as a central control unit (CPU) and a memory. More specifically, the CPU time slots are uniformly allotted to the individual virtual machines through time sharing control, while memory spaces are created according to the virtual memory technique and dedicated to the virtual machines, respectively. These memory spaces are made independent of one another so that destruction of any given memory by other virtual machines (i.e. those to which the memory space of concern is not dedicated) is prohibited. There are two input/output processing methods, one is a dedicated device method according to which real input/output devices are employed as virtual input/output devices connected to the virtual machines, respectively, and the other is a multiplexing method according to which one real input/output device is used as a virtual input/output device in common to the plurality of virtual machines.

The former may be typically a tape device or a direct access storage device (referred to as DASD in abbreviation) such as a magnetic disc. The latter or multiplexing system may be typically a unit recorder device such as a card reader, line printer and the like. A basic concept of the virtual machine system is illustrated in FIG. 1. In a real machine 11, the VMM (virtual machine monitor) 14 which is a control program of virtual machines is operative to create the virtual machines 12. Since each of these virtual machines 12 is capable of realizing the functions substantially comparable to those of the real machine 11, conventional OSs 15 can be made operative without modification. Further, owing to the extended machine features created by the OSs 15, execution of user programs 16 is rendered possible. It should be mentioned that interfaces 17 between the real machine 11 and the VMM 14 as well as between the virtual machines 12 and OSs 15 are machine interfaces, respectively, while interfaces 18 between the extended machine features 13 and the user's programs 16 are OS interfaces, respectively.

Next, input/output procedure of files in this virtual machine system will be elucidated by referring to FIG. 2 of the accompanying drawings. From the stand point of the user's program, the function of the OS concerning the input/output of file cna be divided into data management providing simplified procedure for the input/output of a file and an input/output (I/O) supervisor serving for input/output scheduling and device management. FIG. 2 illustrates a manner in which the inputting/outputting (I/O) of a file is performed by way of the data management in accordance with data input/output requests (e.g. data management macro-instruction such as READ, WRITE request) issued from the user program 16. In the data management, preparation of an input/output (I/O) buffer is conducted in accordance with a user request (step 211), while an input/output (I/O) channel program describing the file inputting/outputting (I/O) operation is created (step 212).

Subsequently, control is transferred to the I/O supervisor by making use of an OS interfacing instruction such as supervisor call (SVC) instruction. The I/O supervisor issues a start I/O instruction (SIO instruction) in succession to the I/O scheduling (step 221). The SIO instruction is a privileged instruction which, when issued from the virtual machine, is executed in terms of a virtual privileged instruction, i.e. the non-privileged instruction. Consequently, simulation processing of the virtual SIO instruction is performed at the time of interruption at which a privileged instruction exception is issued to the VMM. The simulation processings are as follows:

(1) Start I/O Simulation (Steps 231 to 234)

In the privileged instruction exception processing (step 231), it is decided that the privileged instruction of concern is the SIO instruction, whereby the control is transferred to the I/O simulation processing (step 232). In the simulation processing, the address of the virtual I/O device is translated to the address of the real I/O device where the virtual I/O device is located, while the virtual channel program is translated to a real channel program through a channel command word (CCW) translation routine (step 233). The SIO instruction is then issued to the real I/O device 24 by way of the I/O supervisor of the VMM to perform the real inputting-/outputting (step 234).

(2) End I/O Simulation (Steps 235 tp 236)

At the end of the I/O processing, control is transferred to the VMM as an I/O interruption. Through I/O interrupt simulation (step 235), the real I/O interruption is translated to the virtual I/O interruption which can be processed by the virtual machine. Subsequently, the interruption is reported to the virtual machine through a dispatcher of the machine (step 236), whereupon the virtual I/O simulation processing comes to an end. The report of the I/O interruption is effected by setting a CSW (channel status word) at a prefix storage ara (PSA) in the memory space of the virtual machine. Subsequently, the supervisor of the OS performs the processing for ending the inputting/outputting operation in the manner mentioned below (step 222). If an abnormal end or completion of CSW (UC bit located at the 4th byte of the CSW being on or "1") is reported, the I/O supervisor of the OS issues the SIO instruction by using the channel program of a sense command to get detailed information of the error. At the end of the current I/O processing, analysis of error is started.

After completion of this processing 222, the data manager of the OS releases the input/output channel program prepared at the step 212 and frees it from the stand-by state (step 213). In this way, processing of the data input/output request to one input/output device from the user program comes to an end. In FIG 2, steps 211 to 213 correspond to the data management, steps 221 to 222 corresponds to the processing executed by the I/O supervisor of the OS, and steps 231 to 236 correspond to the processing effected by the VMM to simulate the virtual SIO instruction.

Here, reference is made to S. E. Madnick and J. J. Donovan "Operating System", McGraw-Hill Inc., 1984, pp. 559-560. The check of the virtual I.O path in the known system disclosed in the above literature (page 559) corresponds to a translation of the address of the virtual I/O device carried out at the above-mentioned step 232, while copying of the CCW, address translation of the CCW and that of the channel command in the known system (page 559) corresponds to the processing executed at the above-mentioned step 233. Further, selection of the real I/O path and issuance of the SIO instruction in the known system (page 560) correspond to the real I/O scheduling at the step 234, while simulation processing accompanying the completion of the I/O operation in the known system (page 560) corresponds to the above-mentioned step 235.

As will be appreciated, a decision about the presence of an input/output request for a file issued by the virtual machine can not be made on the basis of the file but is made only on the basis of the I/O device in which the file is present and the I/O instruction to the I/O device. This in turn means that the I/O supervising processing is performed in duplex by both the OS and VMM of the virtual machine, involving overhead in performance. With a view to evading such overhead, it is known that the I/O device as well as the associated I/O control channel is dedicated to the virtual machine to avoid double I/O management. This arrangement is however impractical in that the number of the I/O devices has to be increased, thereby increasing the cost on the hardware. Under the circumstances, there exists a demand for improvement of overhead by resorting to software. In particular, the fact that even the temporary file such as work file of the OS which is used only temporarily is accompanied with similar overhead is not desirable from the standpoint of the system performance.

Further, problems mentioned below remain to be solved.

(1) When a file such as program library is to be used in common (or in sharing) among the virtual machines, the file can not be used in sharing on a file basis but only on the basis of the I/O device where the file is present.

(2) Nonprofitable processing is inevitable in that the I/O supervisor has to issue again the SIO instruction for making available the detailed information of an error upon occurrence thereof in connection with the I/O processing of file.

SUMMARY OF THE INVENTION

It is therefore a first object of the present invention to provide a file control system for virtual machines which is capable of speeding up and/or simplifying the management of files possessed by the virtual machines.

Another object of the present invention is to provide a file control system for virtual machines which permits simplification of file management on the side of the operating system or OS and facilitation of common or shared use of files among the virtual machines as well as reduction in overhead.

With the above objects in view, a first feature of the invention resides in provision of an interface specialized only to the inputting/outputting of a file between the virtual machine monitor or VMM and the virtual machine interface.

According to a second feature of the present invention, means is provided for allowing a plurality of files possessed by virtual machines to be managed on the side of the VMM by allocating dedicated virtual memory spaces prepared by the VMM to the temporary files possessed by the virtual machines and by performing the file input/output processing at a high speed.

BRIEF DESCRIPTION OF THE DRAWINGS

FIG. 12 is a view showing a configuration of a virtual machine system to which the invention is applied;

DESCRIPTION OF THE PREFERRED EMBODIMENTS

In the first place, an outline of the invention will be elucidated.

Allocation of dedicated virtual memory spaces prepared by the VMM is effected in a manner described below.

(1) The OS of the virtual machine cooperates with the VMM to create a special interface for the input/output of a temporary file. This interface is provided by the input/output commanding SIO instruction and I/O end interruption, and has special CCWs (an abbreviation of channel command word) which are as follows:

(a) CCW for preparation of temporary file space:

This CCW serves for preparing a virtual memory space for the temporary file and serves to designate the file name. When this CCW is issued by the virtual machine, the virtual machine monitor or VMM prepares the virtual memory space which is allocated to the temporary file. In case the space designating the identical file name exists already, the CCW is rejected from execution, which is reported as an error at the end of the CCW interruption.

Figure 8:
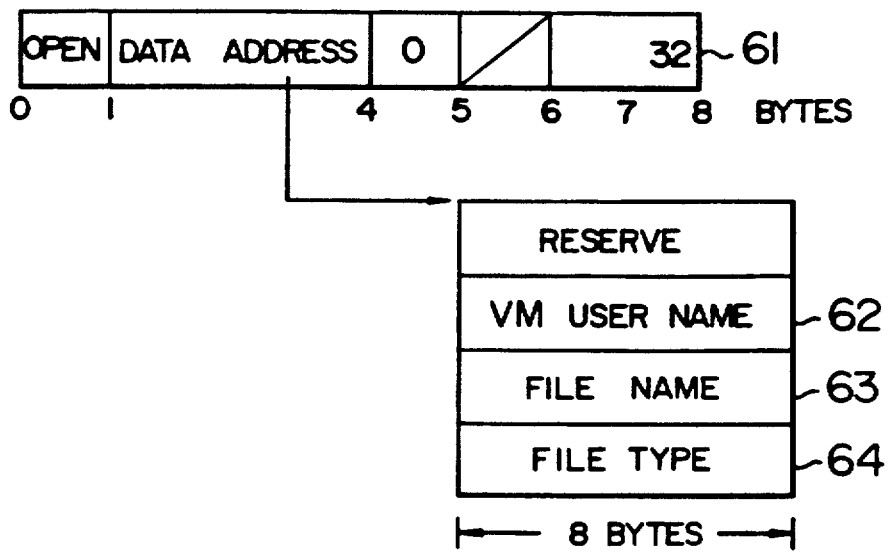
FIGS. 8, 9 and 10 are views for illustrating a CCW serving as file input/output interface between a virtual machine and a VMM.
Figures 14, 15:
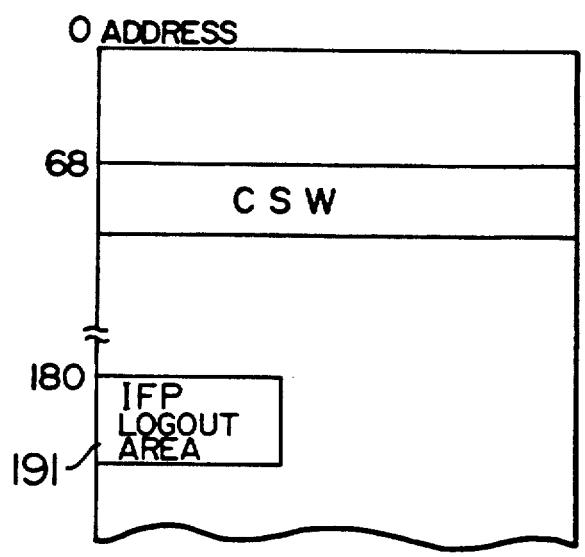
FIG. 14 is a view for illustrating a prefix storage area (PSA) in which information of an end I/O interruption is stored.
FIG. 15 is a view for illustrating, by way of example, error information as set upon the occurrrence of an abnormal end of input/output processing.

(b) Temporary file open CCW:

The open CCW corresponds to an open macro instruction and serves for declaring the start of use of a temporary file to the VMM upon starting of use of the temporary file, whereby correspondence is established between a subsequent data input/output request and the temporary file. This CCW is shown in FIG. 8 or FIG. 14 and will be explained later on in connection with the first or second embodiment of the invention.

Figure 9:
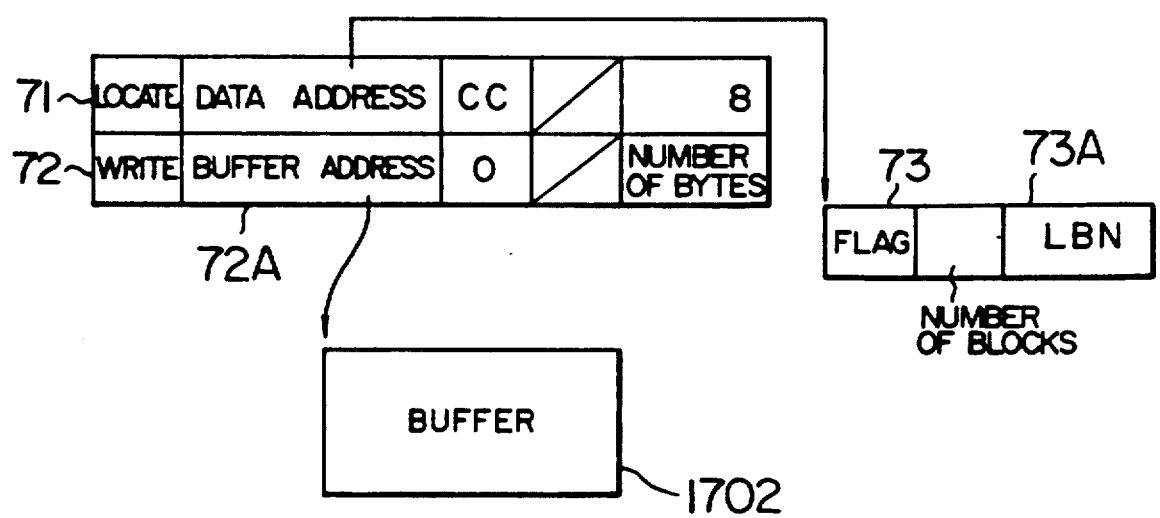

(c) Data input/output (I/O) CCW:

This CCW is used for requesting inputting/outputting of data from the temporary file to the user buffer or vice versa and is composed of a LOCATE command indicating location of a command, a READ command for designating the input processing, and a WRITE command designating the output processing. This CCW is shown in FIG. 9 or FIG. 15 and will be explained later in more detail in connection with the description of the first or second embodiment of the invention. The aforementioned temporary file is of a uniformized fixed block format, wherein the position of the data block designated by the LOCATE command is represented by a logical block number relative to the leading or prefix block of the file. This relative logical block number corresponds to a virtual address in the virtual memory space of the temporary file. When the LOCATE command is issued from the virtual machine, the VMM translates the logical block number to the virtual address in the virtual memory space. After an aimed block (virtual memory page) has been detected, data transfer is executed between the buffer and the virtual memory of the temporary file in accordance with the READ or WRITE command issued in succession to the LOCATE command. Translation of the logical block number to the virtual address can be realized by shifting the block number to the left by the amount of the block length in response to an SLL (abbreviation of shift left logical) instruction. Data transfer between the buffer and the virtual memory can take place under the command of an MVCL (move long) instruction.

(d) Temporary file close CCW:

This CCW corresponds to a CLOSE macro instruction and serves to declare the end of use of a temporary file to the VMM at the end of use of the temporary file. Henceforth, no correspondence exists between the data input/output request and the temporary file.

(e) Temporary file space delete CCW:

When the CCW is issued, the virtual memory space used in the temporary file is deleted. This delete CCW designates the file name of the temporary file having the virtual memory space to be deleted. However, temporary file memory spaces of the other virtual machines can not be deleted.

(2) Logical I/O device address is established to each of the temporary files possessed or owned by the virtual machines. This logical I/O device address is designated by the operand of the I/O instruction (SIO instruction) commanding execution of the special CCWs between the virtual machine and the VMM and is set in correspondence with the file in each virtual machine. The same logical I/O device address can be employed for different virtual machines. Further, by defining one and the same temporary file by different logical I/O device addresses, multiple accesses to one file are made possible. The aim of providing the logical I/O device address for every temporary file is to allow the VMM to control the files by handling them on the basis of one file-one I/O device, which files have been heretofore able to recognized only by the OS associated with the virtual machine.

(3) The logical block number designated upon inputting/outputting of data of the temporary file is translated to the virtual memory space address under the command of a SLL instruction. When the address is beyond the upper limit of the virtual memory space, another virtual memory space is created, to which data is transferred. In this way, a single file can be backed up by a plurality of virtual memory spaces. The surpassing of the memory space can be detected when the translated virtual address goes beyond the number of bits representative of the upper limit of the virtual memory space in the course of translation of the logical block number, wherein the number of the virtual memory space is indicated by the numerical value represented by the surplus number of bits.

As will now be appreciated, a basic feature of the present invention resides in that an I/O interface specialized only to the temporary file is provided between the virtual machine and the VMM which has heretofore been the machine interface, to thereby speed up the input/output processing of the temporary file by providing the storage location thereof in the virtual memory space created by the VMM.

In the foregoing, allocation of the special memory space prepared or created by the VMM to the temporary files owned by the virtual machines has been outlined.

Next, description will be made on the management of a plurality of files owned by the virtual machines as well as a preferred manner of file sharing among the virtual machines.

Figure 1:
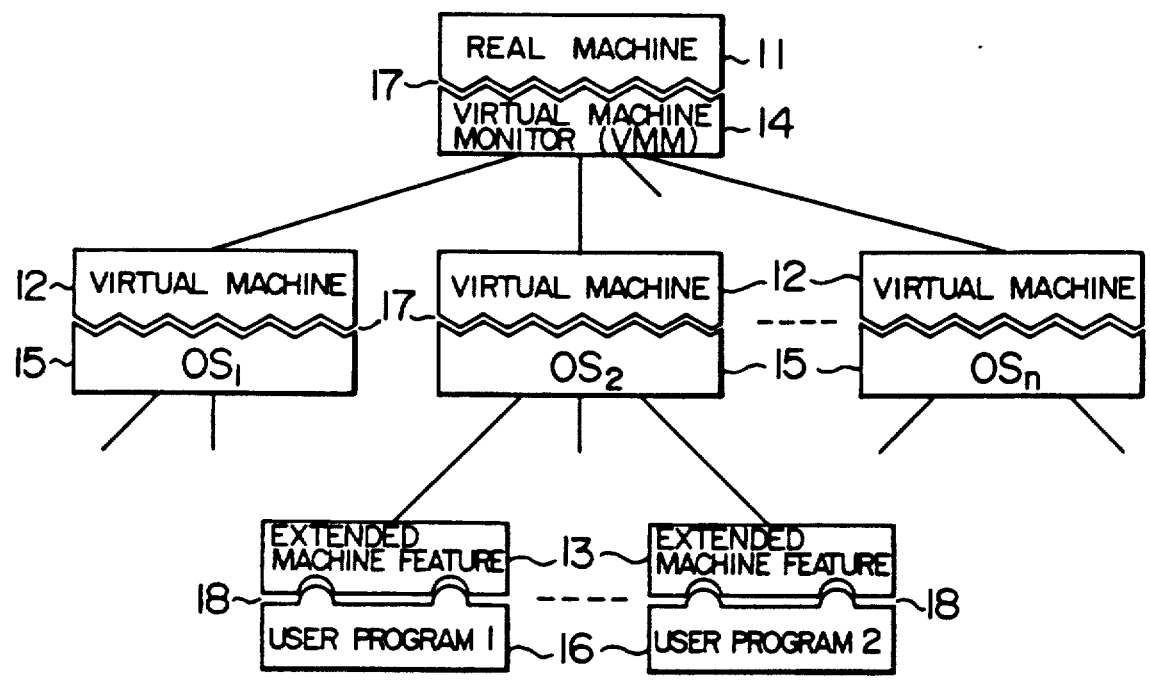
FIG. 1 is a schematic view illustrating the concept of a virtual machine system.
Figure 3:
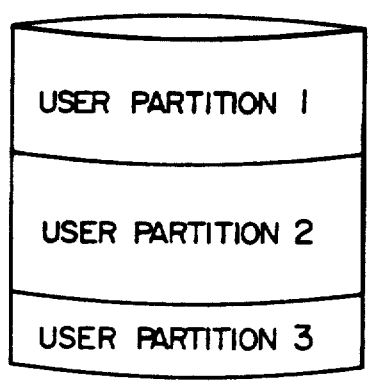
FIG. 3 is a view illustrating the status in which a secondary storage device is allocated as user partitions to virtual machines on a user basis.

(1) As means for managing the files on the side of the VMM which is a control program of the virtual machines, an input/output file managing program (referred to as an integrated file control program or IFP in abbreviation) is provided which differs from the heretofore known I/O instruction simulation processing. This program is not used in the first embodiment of the invention but is used in the second embodiment described below. The functions of the IFP are as follows:

(a) Space managing function for file regions:

In a secondary storage device, a predetermined file region (referred to as the user partition) is allocated to each of the virtual machines. All the files owned by a virtual machine are stored in the user partition allocated to that machine, while allocation and deletion of the file space are effected in accordance with the request of the virtual machine. FIG. 3 shows the status in which the secondary storage device is allocated to a plurality of the user partitions.

(b) File managing function:

A list (1901 in FIG. 9) of names of files owned by each virtual machine is managed. Additionally, it is monitored whether the file is being used (opened) or whether the file is shared in use by another virtual machine.

(c) Input/output function:

According to the request from the virtual machine, an input/output channel program is created for executing the requested input/output processing.

(2) As the interface for the file input/output processing between the virtual machine and the VMM, there are provided the means serving for the functions mentioned below.

Figure 4:
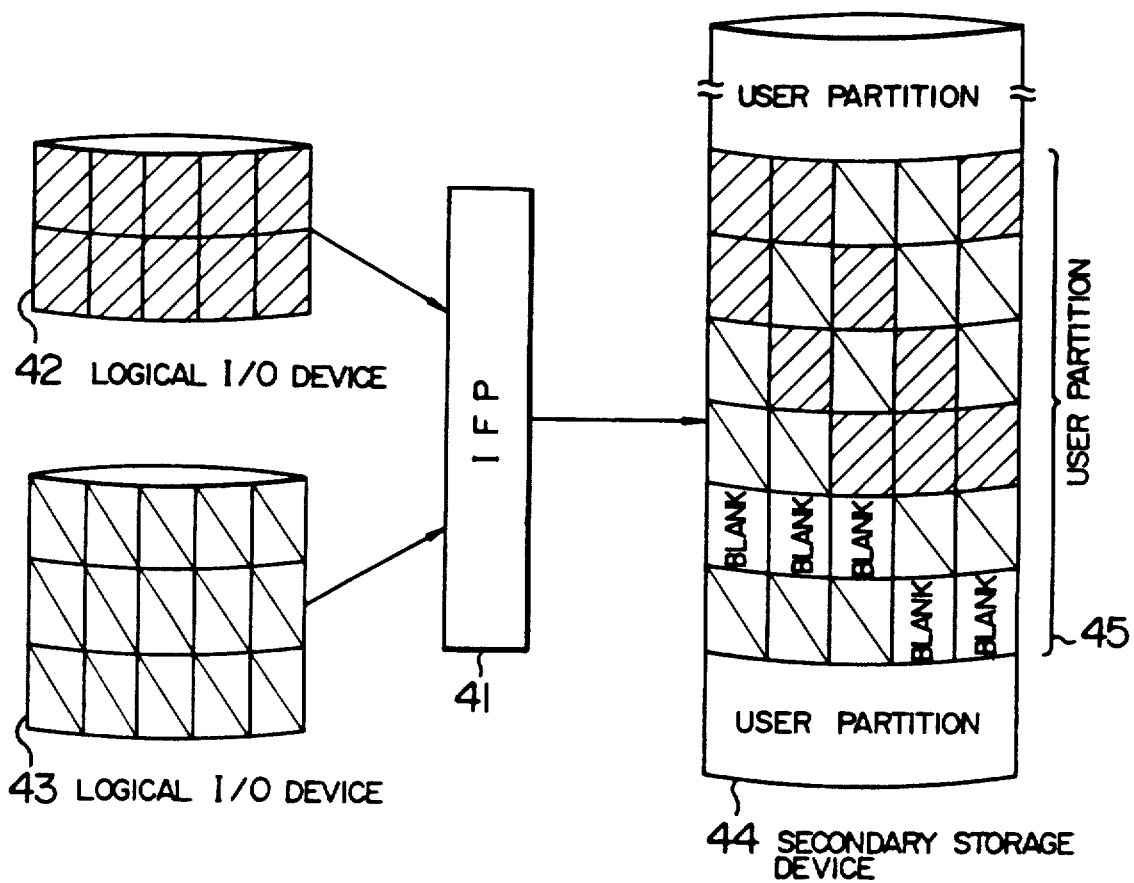
FIG. 4 is a view for illustrating relations between the user partition and logical direct access storage devices for the files of a virtual machines.

(a) Definition of files as logical I/O devices:

Each of the files owned by the virtual machine is defined as a single non-existing logical I/O device, wherein all the I/O requests to the files are replaced by I/O instructions to the respective logical I/O devices for informing the VMM of the file subjected to the input/output processing. The definition of the logical I/O device is effectuated at the start (opening) of a use of file by issuing the SIO instruction to the logical I/O device and a specialized channel program described hereinafter. At the end (closing) of use of the file, an SIO instruction indicative of the end of use of the file is issued, whereby the definition of the file as the logical I/O device is cleared. FIG. 4 illustrates the relation between the logical I/O devices and the user partitions on the assumption that a pair of files are defined as uniformized logical I/O devices 42 and 43 each having a fixed block format, wherein the files are in reality managed as a whole within a user partition 45 provided for each of the virtual machines in the secondary storage device 44 under the control of the integrated file control program or IFP 41.

(b) Provision of special channel program

A special channel program is established as the interface between the virtual machine and the VMM for the processings of a file transfer request from the virtual machine, file opening/closing, creation and deletion of file and the like. The special channel program is composed of simplified CCWs (channel command word) for the logical I/O devices of the fixed block format. The request for the transfer of a data block from a file is represented by a simplified form of the logical block number of the related logical I/O device and the number of blocks counted from the leading one.

(c) Provision of special I/O interruption:

Upon completion of the input/output processing, interrupt information inherent to the device typified by the channel status word or CSW is transferred to the virtual machine together with a CSW indicative of the I/O end. Additionally, upon abnormal end or completion of the I/O processing, sense information describing in detail the abnormal status is supplied to the virtual machine. The storage region for the sense information is provided in the prefix storage area of PSA of the memory space of the virtual machine as is with the case of CSW.

As will now be appreciated, a feature of the present invention resides in the provision of a simplified input/output interface specialized to the file between the virtual machine and the VMM which has heretofore been the machine interface, to thereby reduce the overhead of OS of the virtual machine, while making possible the sharing of the file unit among the virtual machines.

Now, the invention will be described in conjunction with two exemplary embodiments thereof.

The features of the present invention provided in the embodiments described below can be outlined as follows. The I/O mapping in the hitherto known VMM is performed on a device basis in such a manner that the virtual I/O device of the VM is mapped to the real I/O device. In contrast, the present invention makes it possible to cope with the I/O mapping with a file which is more of a logical information unit instead of a device. In consideration of the machine interface between the OS and the VMM, there is additionally provided means for commanding file manipulation to the machine interface. This means is constituted by a dedicated CCW shown in FIGS. 8, 9 and 10 or a logical I/O device shown in FIGS. 4 or 6.

By virtue of this file-based I/O mapping, the resource management of the VM can be realized on a file basis rather than on a device basis. Besides, improved performance can be assured, as exemplified by the first embodiment described below.

According to the first embodiment of the invention, a file for temporary use (i.e. the temporary file) which need not be reserved in the secondary storage device is allocated to the virtual memory space (virtual file space) provided separately from the memory space of the VM, whereby the inputting-outputting to/from the file is realized by the data transfer within a real memory and by the paging which can assure a high-speed inputting/outputting.

On the other had, in the case of the second embodiment of the invention described hereinafter, a non-temporary file (permanent file) which needs to be reserved is employed. In this regard, the file input/output request from the VM is translated to an input/output request to the secondary storage held by the VMM for executing the real input/output operation.

First Embodiment

According to this embodiment of the invention, a file temporary use (i.e. the temporary file) which need not be reserved in the secondary storage is allocated to the virtual memory space (virtual file space) provided separately from the memory space of the VM, whereby the inputting/outputting to/from the file is realized by data transfer within a real memory and by paging which can assure a high-speed inputting/outputting operation.

Figure 5:
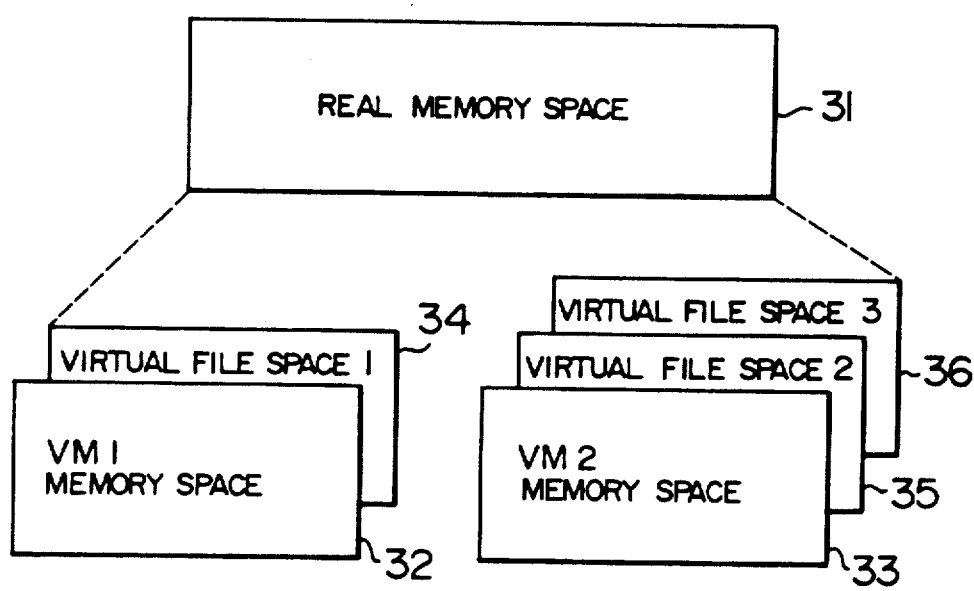
FIG. 5 is a view for illustrating relations among various memory spaces.
Figure 6:
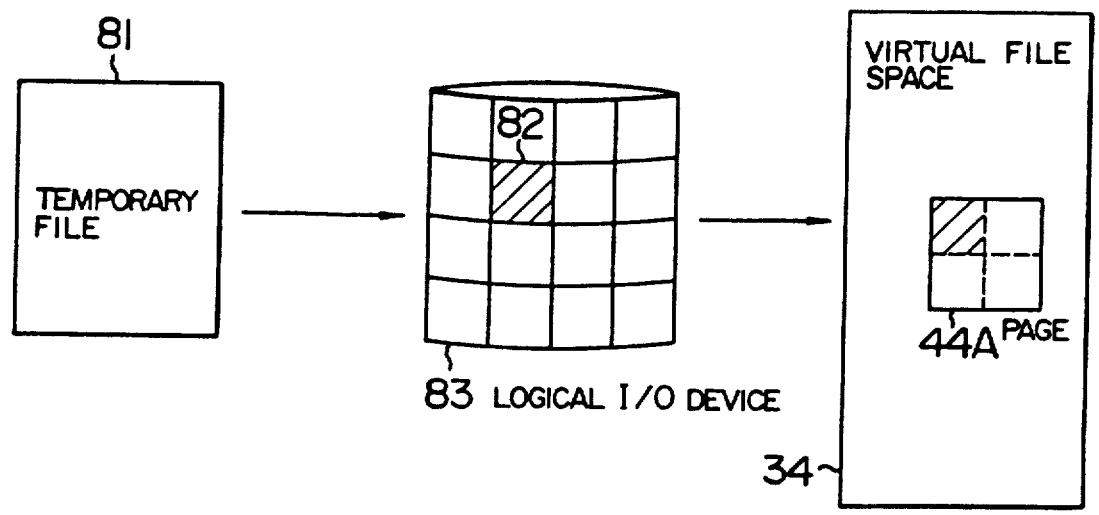
FIG. 6 is a view for illustrating relations among a temporary file, a logical I/O device and a virtual memory space.
Figure 16:
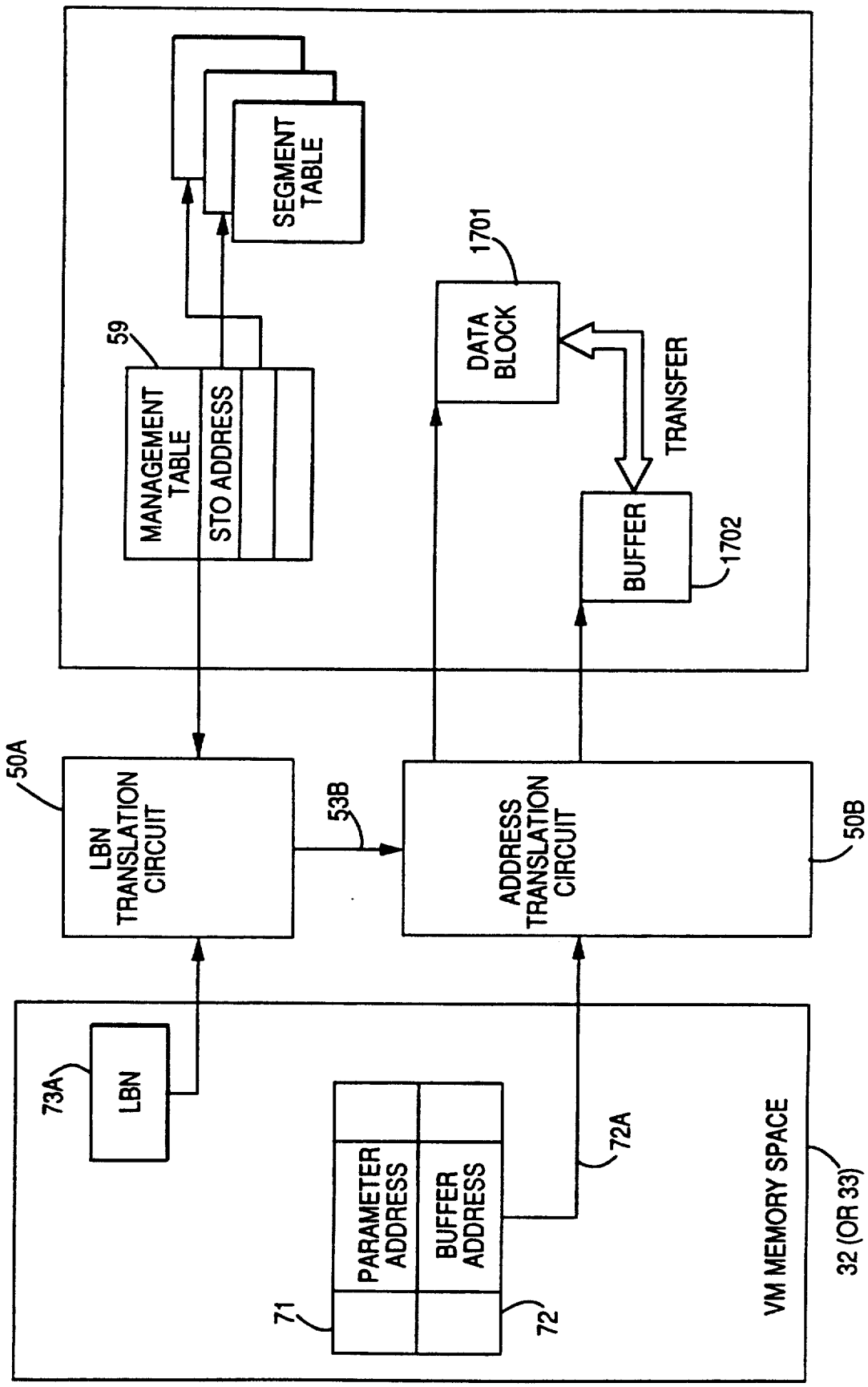
FIG. 16 is a view for illustrating conceptually the processing of an input/output request to a temporary file in a first embodiment of the present invention.

Referring to FIG. 5 which is a view showing locations of the virtual memory spaces of temporary files (hereinafter referred to as virtual file spaces), the virtual memory space created by the virtual machine (hereinafter referred to as VM in abbreviation) is divided into memory spaced 32 and 34 and the virtual file spaces 33, 35 and 36, where the virtual memory spaces are independent of one another. All of these spaces are created and managed by the VMM and mapped onto a real memory (main storage) space 31. FIG. 6 is a view illustrating the relation among the temporary file, the logical I/O device and the virtual file space. As will be seen, a temporary file 81 of a virtual machine is defined in a logical I/O device 83 configured in a single fixed block format, wherein the logical I/O device 83 corresponds to the virtual file space 34 created by the VMM. Correspondence between the temporary file 81 and the logical I/O device 83 is established by the OS of the virtual machine, while the correspondence between the logical I/O device 83 and the virtual file space 34 is established by the VMM. In the case of the example illustrated in FIG. 6, it is assumed that the block size of each block, e.g. 82 in the logical I/O device is 1 KB, the size of a page, e.g. 44A which is a block unit in the virtual file space is 4 KB, and that the block 82 in the logical I/O device corresponds to ¼ of one page 44A in the virtual file. FIG. 16 is a view illustrating conceptually the processing of the input/output request to the temporary file. In this case, it is assumed that the transfer of a data block on the real memory space 31 of a given temporary file to the buffer area 1702 is requested for as the input/output request. The intra-file relative block number (LBN) 73A in the VM memory space 32 (or 33) as designated by the input/output request (CCW 71 or 72) is translated to the virtual address 53B of the abovementioned virtual file space 34 (or 35 or 36) through the LBN translation circuit 50A. The virtual address 53B thus derived is further translated to the real address for the data block 1701 on the memory space 31 through the address translation circuit 50B. More specifically, the address translation circuit 50B translates the virtual address 72A of the buffer 1702 designated by the CCW 72 to the address of the real memory space 31. The data block transfer is performed between the data block 1701 indicated by the LBN resulting from the translation and the buffer area 1702 designated by the abovementioned input/output request. Address translation for the data block in the logical I/O device can be accomplished by multiplying the relative block number of the data block with the block length (i.e. shifting to left by an amount equal to the length of the block). This address translation procedure will be elucidated in conjunction with FIG. 7.

Figure 7:
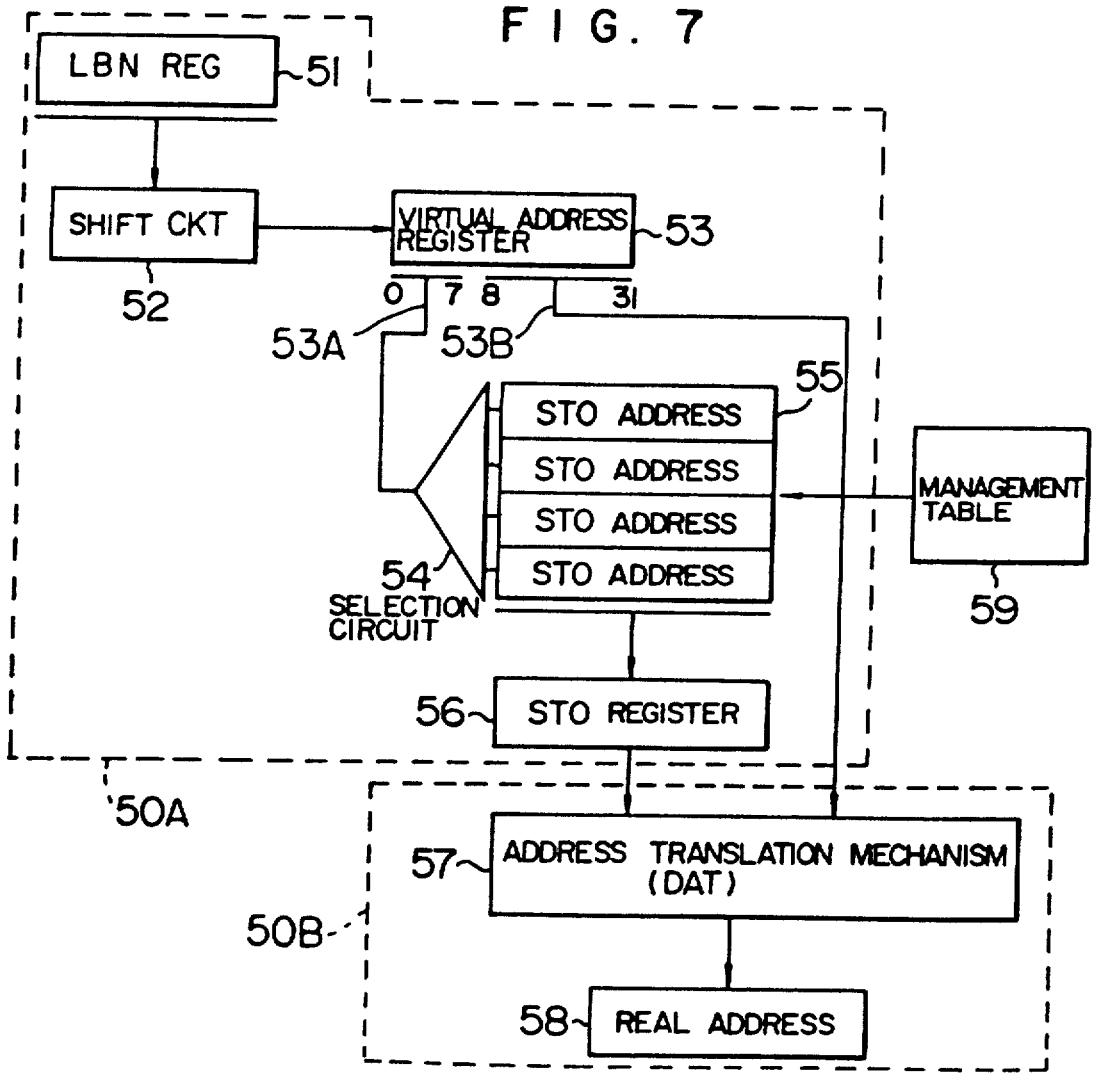
FIG. 7 is a view showing an LBN (logical block number) translation circuit for illustrating data locations.

Referring to FIG. 7, the LBN 51 in the register indicative of the position of a given data block in the logical I/O device 83 operating in the input mode is translated into a virtual address in a virtual address register 53 by way of a shift circuit 52 having the block length of the LBN 51 as a parameter. Assuming, by way of example, that the block length is 1 KB, the value of LBN may be shifted to the left by 10 bits. In the case of the example illustrated in FIG. 7, it is assumed that the size of the virtual file space is 16 MB. Accordingly, for the file of a size exceeding 16 MB, a plurality of virtual file spaces may be made use of. The address space of 16 MB can be accessed with 24 bits. The virtual memory space is of a segment/page management type as is the case with the memory space of the ordinary virtual machine, wherein origin addresses (referred to as a STO address) of the segment tables of the virtual file spaces are managed as an STO address stack in a managing table 59 of the logical I/O device 82 corresponding to the associated temporary file. The virtual address which results from the translation effected by the shift circuit 52 can be divided into 24 bits indicative of the address in the virtual file space and 8 bits representative of the space number. With these eight more significant bits, the relevant address is selected by a selecting circuit 54 from the STO stack 55 set by the management table 59 upon translation into the LBN, the selected STO address being loaded into an STO address register 56. With the contents of this STO address register 53 and the 24 less significant bits of the virtual address register 53, the real address (main storage address) 58 can be obtained through a dynamic address translation mechanism 57.

Next, examples of the CCW which constitutes the I/O interface between the virtual machine and the VMM will be described with reference to FIGS. 8 and 9. The format of the CCW is similar to that of the hitherto known one in that it is composed of a command code, a data address, a flag and a byte count, but differs from the latter in that a special code is set at the location of the command code. FIG. 8 is a view illustrating the format of the OPEN CCW which is issued upon opening of the temporary file and designates the owner's name 62 of the virtual machine (also referred to as VM user name) and a file type 64 as the open information. The file type 64 is a code indicative of attributes of data in the file such as source program language and library attributes. This code is commonly used in the file system of the OS. Designation of the VM user name 62 is effected only when the file of another virtual machine is to be used. There arises no necessity to make such designation, when the file of the associated virtual machine is used. By virtue of this feature, it is possible to place in the virtual file space a program library and the like so as to be used in sharing among a plurality of virtual machines, to thereby increase the speed of the input/output operation. The temporary file space preparation CCW and the temporary file space deletion CCW which are used in addition to the file open CCW are each of the same CCW format as the one shown in FIG. 8 except that the command code differs from that of the latter. The data input/output CCW is of a format illustrated in FIG. 9. As will be seen, this CCW is composed of a LOCATE command 71 indicative of the data location in the file and READ/WRITE command 72 descriptive of the input/output operation. In the case of the example illustrated in FIG. 9, the WRITE (output) command is active.

Figure 10:
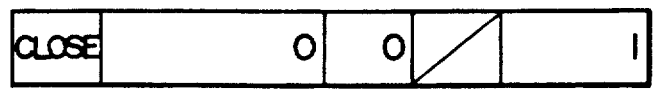

The LOCATE command 71 and the WRITE command 72 are linked by a CC (command chain) so as to be processed successively. A parameter 37 designated by the LOCATE command 71 is composed of a flag field indicative of the input/output operation, a block number field indicative of the amount of blocks to be transferred and an LBN field indicative of the location of data. The WRITE command 72 includes a data address field which serves to designate the buffer address of the user virtual machine. The READ command is of the same CCW format as that of the WRITE command illustrated in FIG. 9 except for the command code. FIG. 10 shows a format of the close CCW for the temporary file. This CCW has no information but for the command code of "CLOSE". This is because the file is already opened by the OPEN code to establish correspondence between the associated temporary file and the logical I/O device at the time when the CLOSE command is issued, whereby the file to be closed can be discriminatively identified by issuing the CCW of the CLOSE command at the address of the logical I/O device mentioned above.

Figure 11:
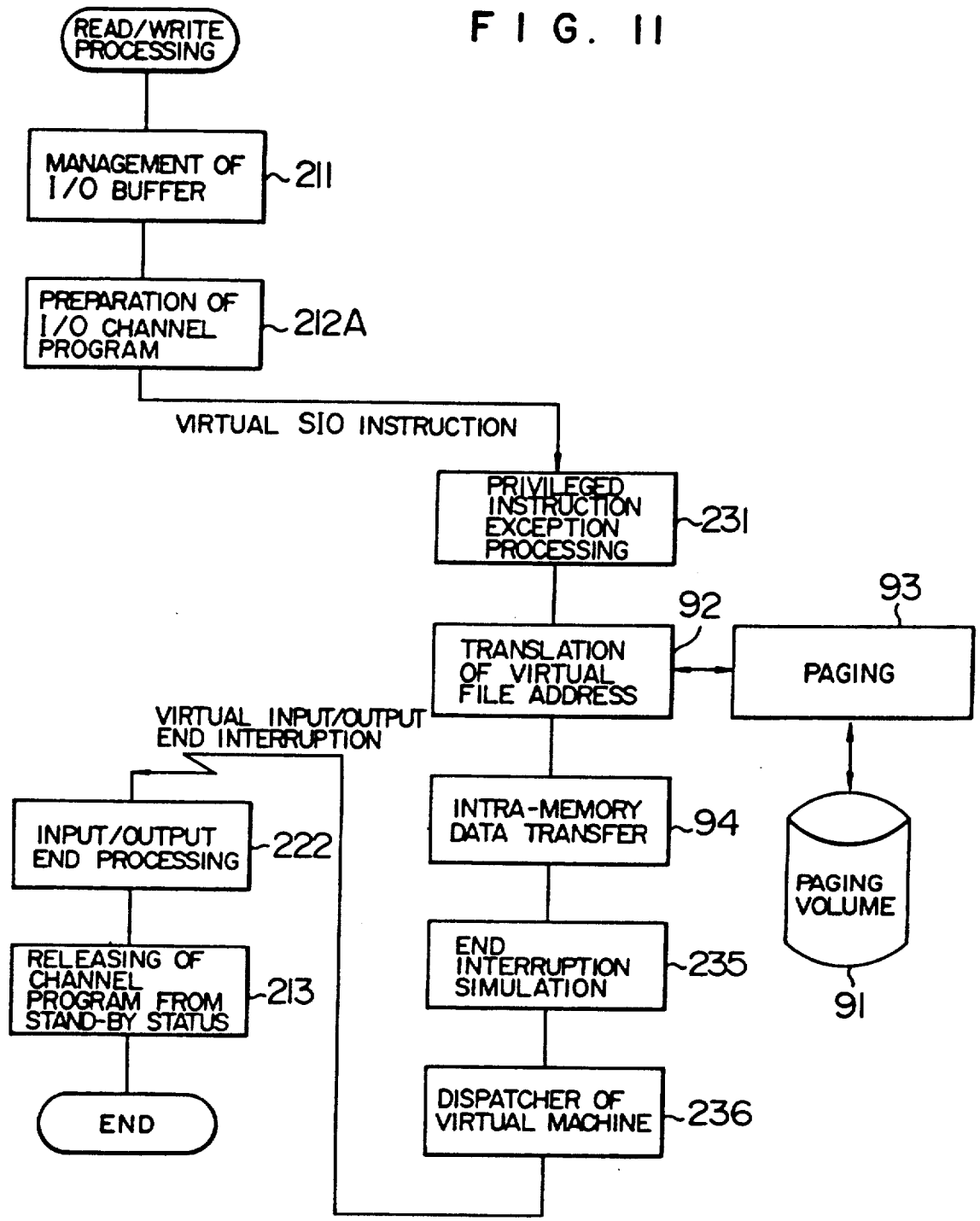
FIG. 11 is a view for illustrating a file input/output procedure according to an embodiment of the invention.

FIG. 11 is a view illustrating file input/output procedure to which the temporary file control described above is applied. In FIG. 11, same reference numerals as those used in FIG. 2 denote same or like components shown in latter. It should be noted that FIG. 11 illustrates the input/output procedure for the temporary file which is to follow the READ/WRITE macroinstruction processing for the data management, as in the case of FIG. 2, which should therefore be referred to in the following description. In the data management, the I/O buffer is managed with the channel program being prepared (step 212A). However, it is important to note that the channel program in concern is not complicated, differing from the hitherto known program of CKD (count, key and data) format but very simple, as will be seen in FIGS. 8, 9 and 10, whereby the processing for preparing the channel program can be significantly simplified and facilitated.

Besides, no I/O schedule processing is needed for the logical I/O device in succession to the preparation of the channel program, allowing the virtual SIO instruction to be directly executed. By virtue of this feature, the I/O schedule processing shown in FIG. 2 (step 221) can be spared. Control of the virtual SIO instruction issued by the virtual machine is transferred to the VMM as the interruption of the privileged instruction exception, as is the case with the hitherto known system. According to the hitherto known input/output procedure, the SIO instruction is simulated to execute the real input/output instruction. In contrast, according to the teaching of the invention, the address translation processing (step 92) such as illustrated in FIG. 7 is carried out, wherein the data transfer is performed between the data block in the real memory (main storage) and the user buffer in the real memory (main storage) whose addresses are determined by the address translation because the contents of the file are present in the virtual memory space. If the address translation results in failure (i.e. when the data block in the virtual file space is absent in the real memory, i.e. main memory) in the virtual address translation processing (step 92), the relevant or associated page is fetched into the real memory (main storage) through the page processing by the VMM (step 93) to execute the data transfer (step 94). On the other hand, in the processing for preparing the temporary file in the WRITE operation, allocation is not yet newly made and no data is present in the virtual file space. Consequently, translation exception takes place in the virtual address translation processing (step 92). In that case, a new page is allocated through the memory management of the VMM and the contents of the user buffer are then transferred to the new page. In this way, the virtual file space is created progressively through the WRITE operation to the temporary file.

Figure 17:
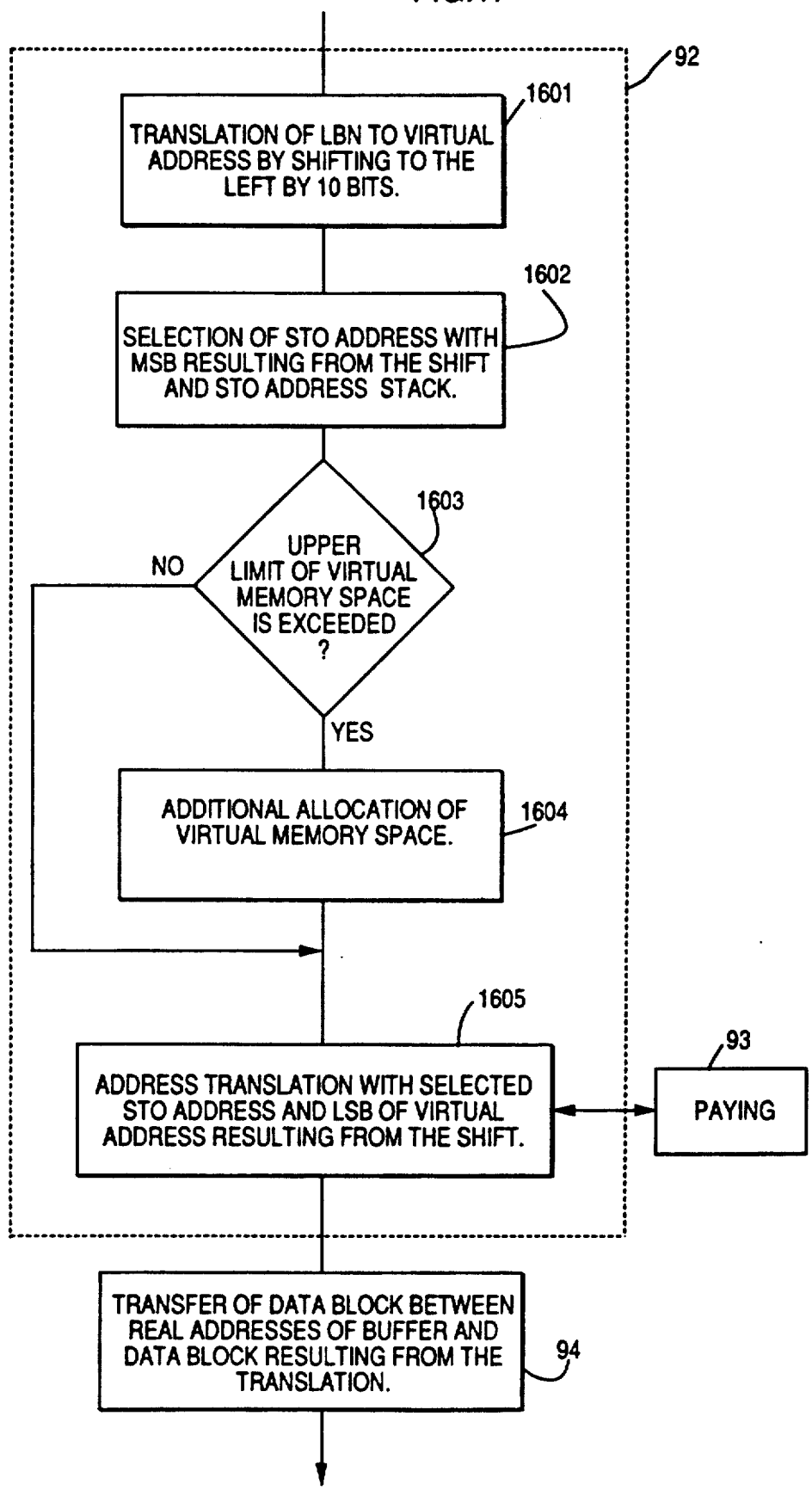
FIG. 17 shows a flow chart for illustrating in more detail the processing 92 shown in FIG. 11.

This step 92 is illustrated in detail in FIG. 17. At a step 1601 shown in this figure, the LBN representing the intrafile relative block number is shifted to the left by the length of a block (10 bits in the case of 1 KB) to be translated to the virtual address, as described hereinbefore in conjunction with the allocation of the dedicated virtual memory spaces.

At a step 1602, the most significant bit (53A in FIG. 7) of the virtual address resulting from the above-mentioned shift and the management table (59 in FIG. 7) holding a group of STO addresses (STO address stack) of the virtual memory spaces of the file are made use of for selecting a STO address, as described hereinbefore in conjunction with the block 50A shown in FIG. 7.

At a step 1603, it is checked whether the request of concern is a WRITE command which exceeds the virtual memory space prepared initially, when the step 1602 has failed in the selection. If so, the allocation of additional virtual memory space is effected at a step 1604, as described hereinbefore in conjunction with the allocation of the dedicated virtual memory space. At a step 1605, the address translation is performed by using the STO address selected at the step 1602 and the least significant bit (53B in FIG. 7) resulting from the above-mentioned shift, whereby the rear address of the data block designated by the LBN mentioned above can be obtained. Since the block of concern is not present in the real memory, the control is transferred to the paging processing 93 when the address translation mentioned has proven to be unsuccessful, whereby the block of concern is transferred to the real memory from the paging device 91 to execute again the step 1605.

Similarly, the buffer addresses of the OS are also translated to the real addresses at the step 1605. The buffer address translation processing for the OS is the same as the translation processing of the buffer address portion of the CCW performed heretofore in the virtual CCW translation processing (step 233 in FIG. 2). The real address translation processing at this step 1605 is performed in the block 50B shown in FIG. 7.

At a step 94, address transfer is carried out between the real address of the data block resulting from the translation and the real address of the buffer on the side of the machine which issued the request.

The transfer processing in the real memory is also shown in FIG. 17. The LBN designated by the CCW 71 of the OS is used in the selection of the STO address and undergoes address translation to the virtual address through the LBN translation circuit 50A, as described above in conjunction with the steps 1601 and 1602.

The virtual address 53B outputted from the translation circuit is inputted to the address translation circuit 50B known heretofore, whereby the real address of the data block 1701 corresponding to the LBN of the concern is determined. Subsequently, the buffer address of the OS for inputting/outputting the above-mentioned block is inputted to the address translation circuit 50B, whereby the real address of the buffer 1702 is determined. The transfer is performed between the block 1701 and the buffer 1702. In the case of the input request (READ command), the transfer is effectuated from the block 1701 to the buffer 1702. On the other hand, in the case of the output request (WRITE command), the transfer is performed from the buffer 1702 to the block 1701.

Figure 2:
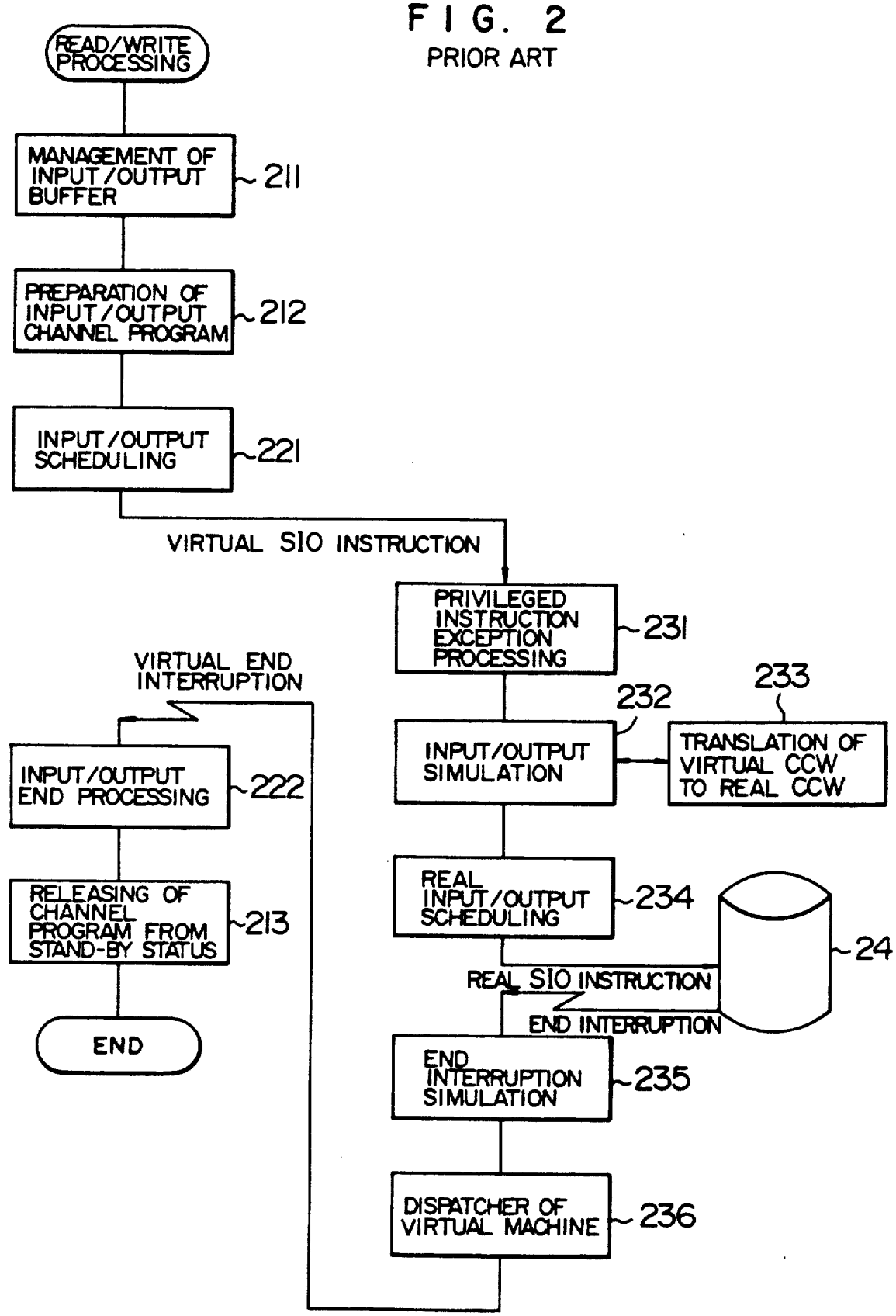
FIG. 2 is a view illustrating file input/output procedure in a hitherto known virtual machine system.

The simulation processing and the dispatch processing of the virtual machine performed in succession to the completed data transfer are the same as in the case shown in FIG. 2. Then, control is transferred back to the virtual machine. The processings executed in the data managing portion such as the interruption processing, release of the channel program and the like are the same as the hitherto known processings.

Second Embodiment

In the second embodiment, a non-temporary file (permanent file) which needs to be reserved is handled. According to this second embodiment, the file inputting/outputting request from the VM is translated to the input/output request to the secondary storage held by the VMM for executing the real inputting/outputting operation.

Figure 13:
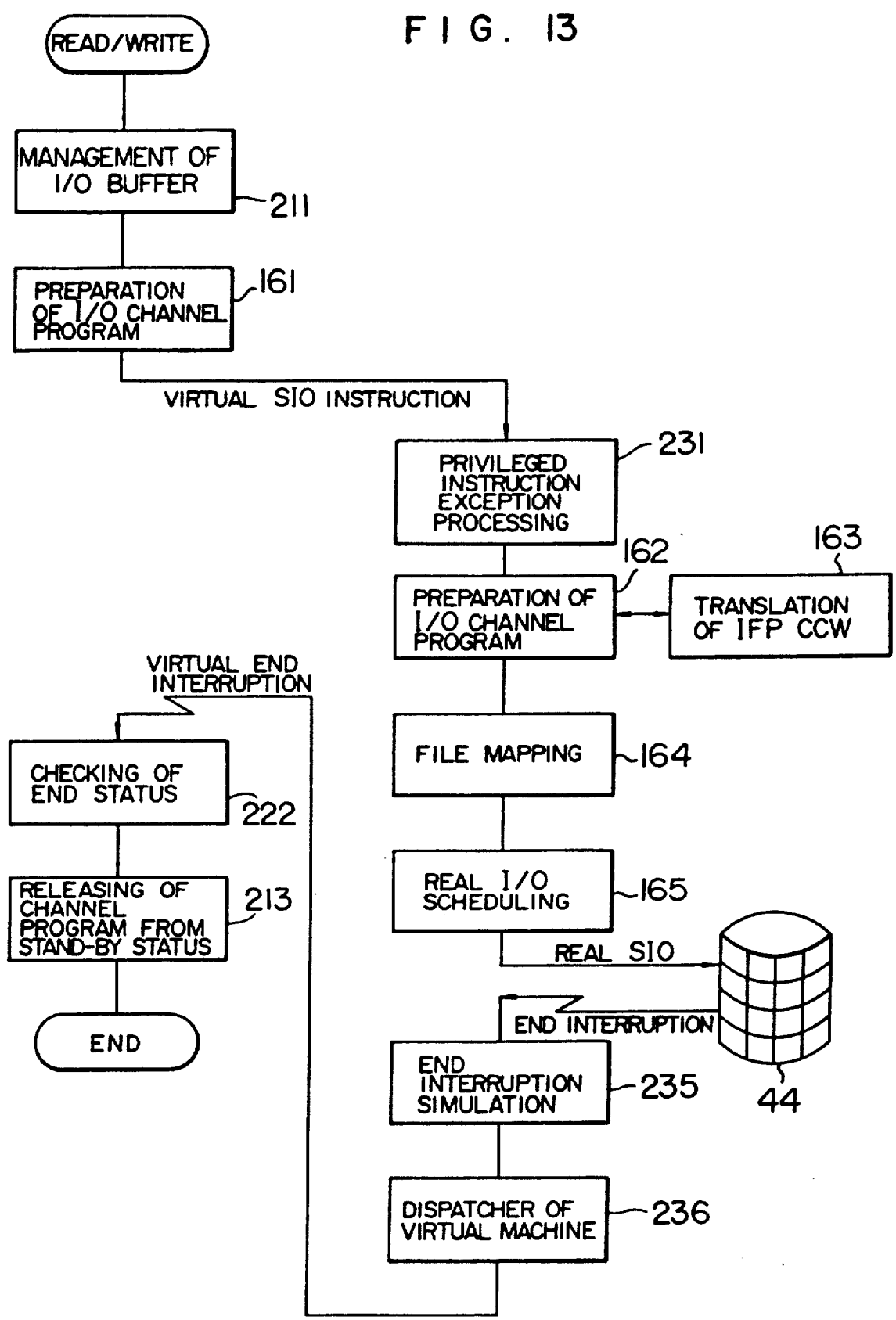
FIG. 13 is a view for illustrating a file input/output procedure in the system shown in FIG. 12.
Figure 19:
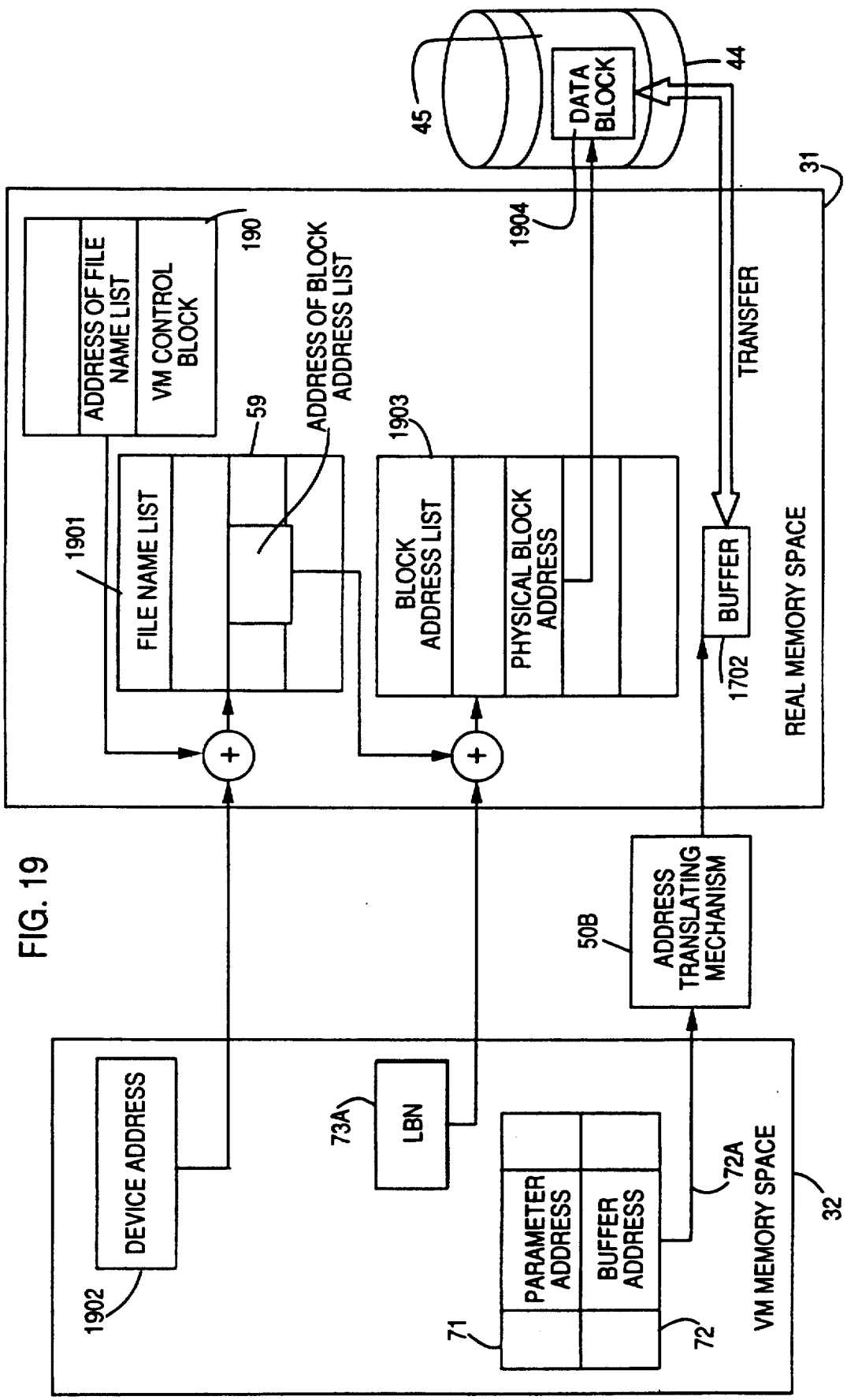
FIG. 19 is a view for illustrating conceptually the processing of an input/output request to a non-temporary file in a second embodiment of the invention.

Description will be made of a second embodiment of the invention. FIG. 12 shows an arrangement of a system to which the integrated file control or IFP 41 (FIG. 4) is applied. The operating system 15 for the virtual machine can be simplified because the device management and the input/output scheduling processing which are heretofore required for the Prior Art can be spared. Further in connection with the VMM 14, it will be noted that the input/output simulation processing which has recourse to hardware in the case of the prior art system is replaced by a file control program 41 capable of handling directly the files which are more logical resources. FIG. 19 is a view for illustrating conceptually the processing for the input/output request to the non-temporary file according to the instant embodiment. The intra-file relative block number (LBN 73A) designated by the input/output request (CCW 71 and 72) from the VM is translated to the block address in the second storage 44 through the management table 59 and the block address list 1903 addressed by the device address 1902. The transfer processing is carried out between the block 1904 in the secondary storage and the real address 1702 of the buffer designated by the above-mentioned input/output request. FIG. 13 illustrates input/output procedure to the file. In FIG. 13, the same reference numerals as those used in FIGS. 2 or 11 denote the same or like parts shown in the latter. In accordance with the file input/output request (data managing macro instruction such as READ and WRITE) issued from the user program 16, control is transferred to data management 155 shown in FIG. 12. In the data management 155, the I/O buffer management (step 211) and creation (step 161) of a channel program specialized to the IFP (integrated file control) 41 are performed, whereby the SIO instruction is issued to a relevant logical I/O device such as, for example, the logical I/O device 42. The CCW created at the step 161 is simplified as compared with the prior art CCW, as will elucidated hereinafter in conjunction with FIGS. 14 and 15. As is the case with the prior art system, the SIO instruction issued from the virtual machine is a virtual privileged instruction, and thus control is transferred to the VMM 14 which includes a program portion 14A (FIG. 12) for executing privileged instruction exception processing (step 231). In the case of the instant embodiment, the SIO instruction which is the hitherto known input/output start instruction is made use of as the means for transferring control to the VMM 14. It should however be understood that the invention is never restricted to the SIO instruction in practice but any instruction which can interrupt the VMM14 and transfer control thereto can be employed to the same effect.

The VMM 14 detects from the device address that the privileged instruction is the SIO instruction directed to the logical I/O device 42 and transfers control to the IFP 41 shown in FIG. 12. In the IFP 41, the channel program for the IFP 41 created in the step 161 through the data management 155 (FIG. 12) undergoes translation processing 1634, to create a real input/output (I/O) channel program (step 162) by means of a program portion 14B (Fig. 12). Thereafter, the logical I/O device 42 is mapped step 164 onto the file in an actual secondary storage device 44, to thereby issue a real SIO instruction through I/O control program portion 14D(FIG. 12) of the VMM (step 165). Thus, an input/output operation is started to the secondary storage device 44. With the phrase "mapping processing" excuted in the step 164, it is intended to refer to the translation of the logical I/O device address (name of file) and the relative or logical block number LBN of the device address into physical block address of for a block in the secondary storage device 44. This translation is effected with the aid of a list 1903 (FIG. 19) of block addresses allocated to the individual files.

Upon completion of the input/output operation of the secondary storage device 44, control is transferred to the VMM 101 with the I/O end interruption. In the IFP41, the I/O end status is added to the end information inherent to the CSW and IFP 41 and is furnished (step 235) to the virtual machine operating system 15 as the virtual I/O interruption after the input/output interrupt simulation (step 235) and the dispatch processing (step 236) have been executed in the manner known heretofore under the control of the program portion 14c (FIG. 12) of VMM. In response to reception of the virtual I/O interruption, the virtual machine or 15 checks the end status (step 222) and releases the associated user program 16 from the stand-by state (step 213), whereupon the input/output operation comes to an end.

Next, description will be made of the input/output (I/O) channel program which is generated in the step 161 and serves as the interface between the virtual machine and the VMM. This I/O channel program is created at a step 212A shown in FIG. 13 and is constituted by the CCW, which is of the same type as that of the CCW used in the first embodiment, as shown in FIGS. 8 and 9. Whether that CCW is concerned with a temporary file processing as in the first embodiment or a fixed permanent file processing as in the second embodiment is distinguished by a specific character added to the file name 63, as shown in FIG. 8, of the OPEN CCW issued when opening the file. In this way, the channel program required for the input/output operation relative to the file can be composed of one or two CAWS, which in turn means that preparation of the channel program on the side of the OS and particularly the data managing portion can be facilitated, while the translation processing of the user CCW by the IFP (step 163 in FIG. 13) can be easily executed.

Figure 18:
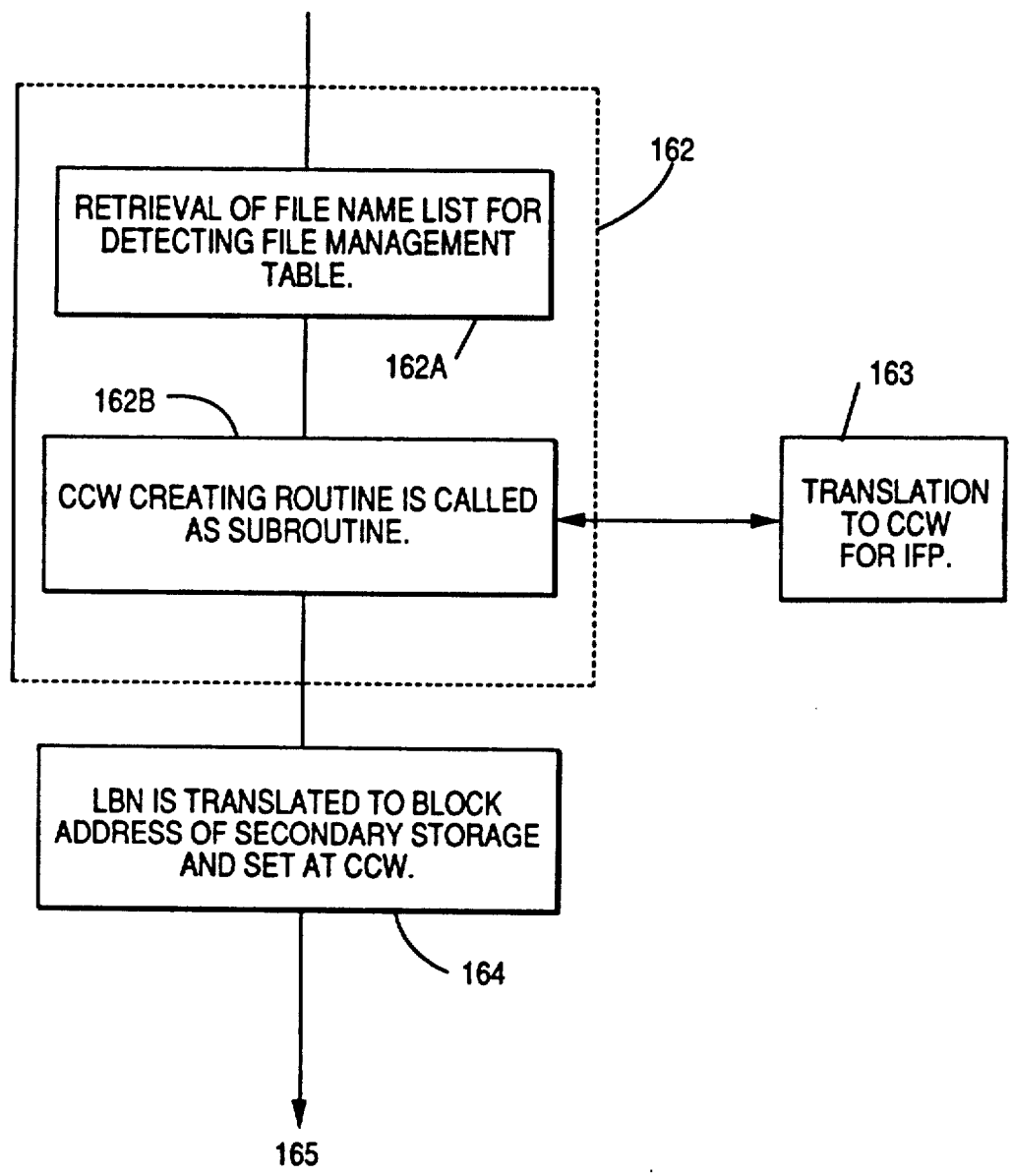
FIG. 18 shows a flow chart for illustrating in more detail the processing 162 shown in FIG. 13.

The processing in the steps 162 and 164 characterizing the present invention are illustrated in detail in FIGS. 18 and 19.

In a step 162A, the file name lists (1901 in FIG. 19) prepared for every VM are retrieved with the aid of the device address (1902 in FIG. 19) of the logical I/O device designated by the SIO instruction to prepare a file management table 59. In the case of the first embodiment in which the temporary file is employed, the management table 59 holds the STO address stacks. On the other hand, in the case of the non-temporary (permanent) file which the instant embodiment concerns, the above-mentioned management table 59 holds the pointers to the address list 1903 which holds the physical block addresses of the secondary storage device 44 for the non-temporary files. Designation of the device address of the logical I/O device with the SIO instruction has been described hereinbefore in conjunction with detection of the types of the privileged instructions by means of the VMM. Management of the file name list for the files owned by every VM by means of the IFP has also been described hereinbefore in connection with the management of a plurality of files owned by the virtual machines. Further, presence of the list 1903 of the block addresses assigned to the files has already been described in conjunction with the translation of the block address in the steps 164.

Thus, each of the VMs has the file name list 1901, as shown in FIG. 19, wherein the block address list can be detected from the file names which constitute entries in the file name list, as will be readily appreciated. The management tables 59 provided in correspondence with the files are equivalent to the entries of the file name list. This management table has not been dealt with specifically in the foregoing description of the second embodiment of the invention. However, in view of the provision in correspondence with the files and the fact that the translation table addresses for translating the LBNs into the block addresses as in the case of the first embodiment are valid, the entry of concern may be defined as the equivalent to the management table. Because of the provision of the above-mentioned device addresses in correspondence with the files, as described hereinbefore in conjunction with the definition of the files as the logical devices, the file can be retrieved from the file name list 1901 with the aid of the device address, while the block address list can be detected from the entries mentioned above.

At a step 162B, the CCW translation processing 163 is referred to as the subroutine for translating the CCW for the IFP prepared by the OS of the machine in which the request originates (see FIG. 13, step 212A) into the CCW for the secondary storage device.

At a step 163, the above-mentioned CCW for the IFP is translated into the real CCW. The CCW for the IFP is of the same format as the CCW in the first embodiment (see FIGS. 9, 10 and 11). Any distinction from the temporary file can be determined in dependence on whether characters specifying the temporary file are included in the file name or not.

At a step 164, the relative block number LBN (73A in FIG. 19) designated by the request issuing machine's CCW (71 in FIG. 19) is extracted, whereby the address of the physical block (data block 1904 in FIG. 19) in the second storage device 44 is determined on the basis of the above-mentioned LBN and the block address list 1903. By using the physical block addresses in the real CCWs prepared at the step 163, a real input/output channel program is completed, whereby the block 1904 as requested can be transferred by issuing the SIO instruction after the I/O scheduling of the real device in the step 165. This transfer processing is performed between the block 1904 and the real buffer 1702 resulting from the address translation of the buffer address 72A designated by the requester's CCW 72, as is shown in FIG. 19. Parenthetically, the processing in the step 164 has been described hereinbefore.

Next, the interface for input/output end interruption between the VMM and the virtual machine will be described. FIG. 14 shows the prefix storage area in the memory space of the virtual machine. At the 68th address, a CCW indicative of the input/output end status is stored. At the 180th address, an area of 2 bytes is provided as an IFP log-out area 191 for storing the sense information upon occurrence of the abnormal end or completion. Storage of the sense information is carried out simultaneously with the ordinary file input/output interruption, to allow the sense SIO instruction otherwise required to be omitted. It should be mentioned that the contents of the sense information are required in effect only at the interface between the IFP and the virtual machine, and thus simplified. An example of the sense information is illustrated in FIG. 15.

As will be appreciated from the foregoing description, the input/output processing or operation which has not been taken into consideration heretofore in conjunction with the temporary file used in the virtual machine can be replaced by the intra-memory data transfer processing by virtue of provision of the interface dedicated only to this end between the virtual machine and the VMM, whereby significant improvement in the performance of the input/output processing of the temporary file can be accomplished, while the OS structure of the virtual machine can be simplified, involving remarkable reduction in overhead.

In particular, it should be noted that the input/output management processing is not performed in duplex on both the OS and VMM, whereby no overhead is involved for the temporary file such as the work file for the OS which is used only transiently. Besides, the file such as a program library can be used in sharing among a plurality of virtual machines on the file basis.

It should further be added that non-profitable processing of the I/O supervisor such as re-issue of the SIO instruction for obtaining the detailed information of an error possibly occurring in the file input/output operation can be spared, to an additional advantage.

We claim:

1. In a computer which realizes virtual machines by concurrently running operating system (OS) programs under control of a virtual machine control program, a file access method for enabling an access to a temporary file in terms of a file name assigned to the file and a data block number assigned to a data block to be accessed within the file, wherein the temporary file is a file located in a main storage of the computer, the method comprising the steps of:

(a) determining, by one of the OS programs, a device address of a virtual secondary storage device for a temporary file in response to a file access request which designates a file name of the file, wherein the virtual secondary storage device has the same number of virtual areas as a total number of data blocks included in the file;

(b) informing, by the one OS program, said virtual machine control program of the device address and a block number within the file designated by the file access request and assigned to a data block to be accessed;

(c) translating, under control of the virtual machine control program, the informed block number within the file into a real address for a real data area of said main storage, in which real data area the data block is, or is to be held, the step of translation including:

(c1) a first substep of translating the informed block number within the file into a virtual address for a virtual data area assigned to a data block of the informed block number among virtual data areas provided in a virtual secondary storage device assigned with the informed device address, and (c2) a second substep of translating the virtual address into the real address; and (d) accessing said real data area of said main storage under control of the virtual machine control program and in response to the real address obtained by the step (c).

2. A file access method according to claim 1, wherein said step (b) further includes a substep of informing said virtual machine control program of a virtual address for a virtual buffer area designated by the file access request within a virtual memory space assigned to the OS program, said virtual buffer area corresponding to a real buffer area within the main storage from or to which area a data block is to be transferred;

said step (c) further includes a substep of translating the virtual address for the virtual buffer area into a real address for the real buffer area; and said step (d) further includes a substep of transferring a data block between the real data area and the real buffer area.

* * * * *